United States Patent [19]

Winkleblack

[11] 4,236,971
[45] Dec. 2, 1980

[54] APPARATUS FOR SEALING A ROTATABLE SHIELD PLUG IN A LIQUID METAL NUCLEAR REACTOR

[75] Inventor: Robert K. Winkleblack, San Jose, Calif.

[73] Assignee: Electric Power Research Institute, Inc., Palo Alto, Calif.

[21] Appl. No.: 885,439

[22] Filed: Mar. 10, 1978

[51] Int. Cl.² ............................................. G21C 13/06
[52] U.S. Cl. .................................... 176/87; 176/50
[58] Field of Search ........................ 176/40, 50, 65, 87

[56] References Cited
U.S. PATENT DOCUMENTS

| | | |
|---|---|---|
| 2,991,905 | 7/1961 | Monson et al. |
| 2,995,505 | 8/1961 | Guild |
| 3,055,538 | 9/1962 | Schoessow ........................ 176/87 |
| 3,514,115 | 5/1970 | Gallo .......................... 176/87 X |
| 3,633,784 | 1/1972 | Taft |
| 3,819,478 | 6/1974 | Thorel et al. |
| 3,819,479 | 6/1974 | Jacquelin |
| 3,867,254 | 2/1975 | Brandsetter |
| 4,026,763 | 5/1977 | Poindexter ........................ 176/87 |
| 4,113,564 | 9/1978 | Garin et al. ........................ 176/87 |
| 4,115,193 | 9/1978 | Sepelak ........................ 176/87 |

*Primary Examiner*—Peter A. Nelson
*Attorney, Agent, or Firm*—Flehr, Hohbach, Test, Albritton & Herbert

[57] ABSTRACT

An apparatus for sealing a rotatable shield plug in a nuclear reactor having liquid metal coolant. The apparatus includes a dip-ring seal adapted to provide a fluid barrier between the liquid metal and the atmosphere and to permit rotation of the shield plug. The apparatus also includes a static seal for the rotatable shield plug located between the dip-ring seal and the liquid metal. The static seal isolates the dip-ring seal from the liquid metal vapor during operation at power and can be disengaged for rotation of the shield plug.

11 Claims, 1 Drawing Figure

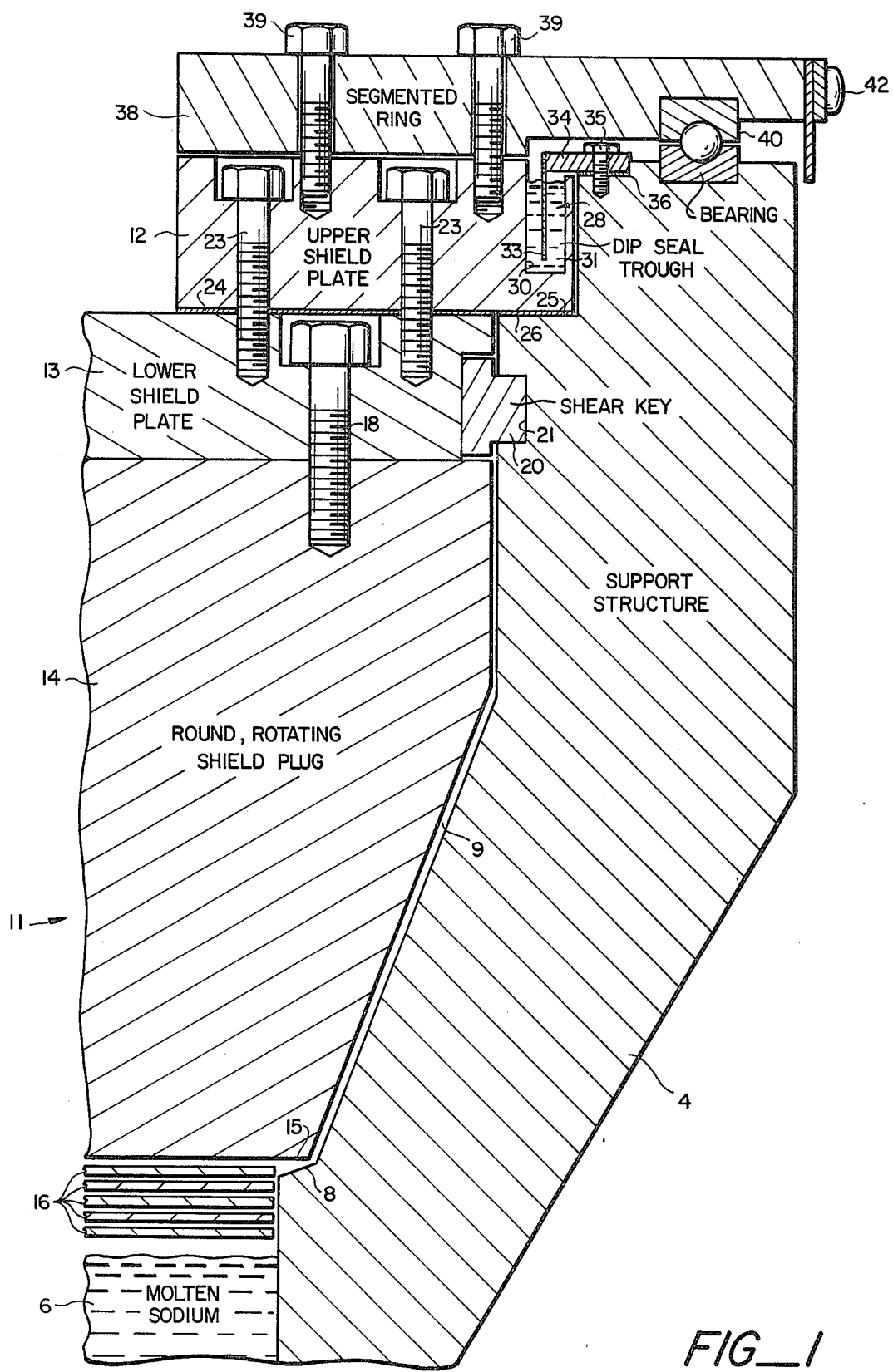
FIG_1

APPARATUS FOR SEALING A ROTATABLE SHIELD PLUG IN A LIQUID METAL NUCLEAR REACTOR

BACKGROUND OF THE INVENTION

This invention generally relates to nuclear reactors which are cooled by a liquid metal and, more particularly, to those nuclear reactors using dip-ring seals to isolate the liquid metal coolant from the atmosphere.

Most breeder reactors that are cooled by a liquid metal have some form of dip-ring seal. A dip-ring seal consists of a deep trough filled with a heavy metal and skirt ring that is dipped into the trough. The heavy metal has a low melting temperature and when heated, the seal provides a fluid barrier between a rotating shield plug and the support structure of the reactor. A rotating shield plus is a massive circular disc that forms the top cover of a reactor. The dip-ring seal permits the rotating plug to move while maintaining a position barrier between the liquid metal coolant and the atmosphere. Typically two or three rotating plugs are used in each reactor in order to permit refueling and fuel handling operations inside of the reactor and underneath the shield plugs.

Heretofore, dip-ring seals and the heavy metal in the trough have been subject to contamination. This contamination originates from the liquid metal vapor in the reactor, usually sodium, which diffuses up the annulus formed between each rotating plug and its support structure. The liquid metal vapor diffuses into the heavy metal in the dip-seal trough and causes contamination. Secondly, when the heavy metal in the dip-seal trough has been heated and melted for rotation of the shield plug, the oxygen in the atmosphere reacts with the molten metal and causes an oxide film to form. Over the years both the sodium and the oxygen cause a percipitation to form which agglomerates into a viscous dross. This dross eventually impedes rotation of the shield plugs.

A further difficulty with prior dip-ring seal designs has been the physical inaccessability of the troughs. In prior designs the dip-ring seals were located far down in the annulus between the shield plug and its support structure. The dip-seals were almost inaccessable for maintenance, and when the viscous dross was formed, removal of the contaminated heavy metal from the trough was very difficult.

OBJECTS AND SUMMARY OF THE INVENTION

It is the primary object of the present invention to develop a sealing system between a rotatable shield plug and a reactor support structure which is easily maintainable over the life of the reactor.

It is another object of the present invention to prevent the exposure of liquid metal vapor to the heavy metal in a dip-seal trough during reactor operation at power. This object is achieved by a static seal which isolates the dip-ring seal from the vapor during periods when the shield plug is not being rotated. The dip-ring seal according to the present invention is only exposed to the vapor when the static seal is disengaged.

A further object of the present invention is to provide an easily accessable dip-seal trough for cleaning and maintenance. This object is achieved by a static seal which isolates the dip-seal trough from the liquid metal vapor and a segmented ring assembly which permits disassembly.

The foregoing and other objects are achieved by a shield plug assembly having a dip-ring seal and a static seal. The static seal is located between the dip-ring seal and the liquid metal coolant in the reactor. The static seal can be engaged to isolate the dip-ring seal from the liquid metal and disengaged to permit rotation of the shield plug with respect to the reactor support structure.

Additional objects and features of the invention will appear from the following description in which the preferred embodiment has been set forth in detail in conjunction with the accompanying drawing.

BRIEF DESCRIPTION OF THE DRAWING

FIG. 1 is a cross-sectional view, partially broken away, in side elevation of a nuclear reactor shield plug and support structure according to the present invention.

DESCRIPTION OF THE PREFERRED EMBODIMENT

FIG. 1 illustrates a closure head of a reactor vessel cooled by a pool of molten sodium 6. The closure head includes a support 4 which is a part of the stationary side wall of the reactor vessel and in particular, is the reactor vessel top flange. The support structure has a downwardly tapering shoulder 8 that allows any sodium condensing in the annulus 9 to drain back down into the pool of molten sodium.

The molten sodium 6 is covered by a shield plug assembly 11. The shield plus assembly has a generally circular shape and includes an upper shield plate 12, a lower shield plate 13 and a shield plug 14. The shield plug assembly is thermally insulated from the molten sodium 6 by a plurality of thermal shields 16. The shield plug assembly rotates with respect to the support structure 4 in order to permit "under the heat" fuel handling operations. The shield plug 14 has a bottom wall 15 which forms a sharp edge with the tapered side wall of the shield plug. This sharp edge can be lowered into metal to metal contact with the tapered shoulder 8 of the support structure. The sharp edge of the shield plug and the shoulder 8 form an abutting seal that can isolate the upper portion of the rotating shield assembly from the molten sodium vapors.

The lower shield plate 13 is bolted to the round shield plug 14 by a plurality of large bolts 18. The lower shield plate and the shield plug separate to permit the mounting of a shear key. Each shear key is a segment of a ring which is placed in th groove 21 in the side wall of the support structure. The shear keys prevent the shield plug assembly from rising vertically upward due to earth quakes and vertical forces generated within the reactor vessel.

The upper shield plate 12 is attached to the lower shield plate 13 by a plurality of bolts 23. The upper shield plate is also separated from the lower shield plate by a circular gasket 24 of known construction. The upper shield plate is supported on a shoulder 26 of the support structure 4. This shoulder and the upper shield plate are separated by a flat annular shaped gasket 25 which has compression limiting pads. The gasket 25 is of known construction and bears the entire weight of the shield plug assembly 11. When the shield plug assembly 11 is lowered on to the shoulder 26 as described below, the gasket forms a static seal between the molten sodium 6 and the atmosphere. During reactor operation, the gasket 25 seals the sodium vapor in the annulus 9 and isolates the vapor from the heavy metal in the dip-seal trough. The static seal thus eliminates the tendency of sodium to contaminate the heavy metal in the dip-seal trough.

The upper shield plate 12 also contains a dip-ring seal 28. The dip-ring seal is formed by a deep circular trough 30 located in the top wall of the shield plug assembly 11. Alternatively, the trough 30 and the dip-ring 28 can be located in the support structure 4 instead of the shield plate 12. The trough is filled with a heavy metal 31 having a low melting temperature, typically a eutectic mixture of lead, tin and bismuth. This metal can be melted at a temperature of less than 250° F. to form a fluid seal. Normally the metal is kept solid and is only melted to permit rotating of the shield plug assembly.

The dip-ring seal 28 also includes a circular skirt ring 33 which is inserted into the heavy metal 31 in the trough 30. The skirt ring is welded to a large round washer 34. The washer is secured to the support structure 4 of the reactor by a plurality of heavy cap screws 35. The skirt ring dips into the trough and maintains a seal between the molten sodium 6 and the atmosphere both when the heavy metal 31 is molten and when it is solidified. The washer 34 is separated from the support structure by a gasket 36 which serves to isolate the sodium vapor from the atmosphere when the static seal 25 is disengaged.

The shield plug assembly 11 is surmounted by a ring assembly 38 which is segmented. These segments can be disassembled for access to the shield plug assembly and the dip-seal 28. The segmented ring assembly 38 is attached to the shield plug assembly by a plurality of bolts 39. When these bolts are tightened, the shield plug assembly is lifted off of the shoulder 26 and the weight of the assembly is then carried by the bearing 40. This bearing is horizontally disposed on the support structure 4 and permits rotation of the shield plug assembly. The shield plug assembly and the segmented ring are rotated together by a motor (not shown) which engages the teeth 42 on the side wall of the segmented ring. These teeth form a large gear that rotates about the vertical axis.

It should be noted that the bearing 40 is exposed to the atmosphere and is protected from sodium vapor by the abutting seal 15, 8 and the static seal 25, and the dip-ring seal 28. Thus, the bearing is never exposed to sodium vapor and the vapor from the bearing lubricant is prevented from diffusing back into the sodium.

Not shown in FIG. 1 are a plurality of heaters which are mounted on the outside wall of the dip-seal trough 30. These heaters are for melting the heavy metal in the trough. Electric leads for these heaters are brought through the segmented ring 38 on the atmospheric side of the dip-ring seal 28. Thermalcouples are also fastened on the outside wall of the trough to sense its temperature so that the viscosity of the heavy metal can be determined. The thermocouple leads are also brought out through the segmented ring on the atmospheric side of the dip-ring seal. Both the electrical heaters and the thermocouples are replaceable when the segmented ring assembly 38 is removed.

During normal operation of the reactor the components of the shield plate assembly 11 including the upper shield plate 12, the lower shield plate 13 and the shield plug 14 are rigidly bolted together. In addition, the bolts 39 are loosened and the entire weight of the shield plug assembly is carried on the shoulder 26 of the support structure. Only the weight of the segmented ring assembly 38 is carried by the bearing 40. The heavy metal 31 in the dip-seal 28 is solid and is isolated from the sodium vapor in the annulus 9 by the static seal 25.

To commence fuel handling operations, the reactor is shut down. The molten sodium 6 in the pool is cooled to a temperature of between 400° and 500° F. The heavy metal 31 in the trough 30 is warmed to a temperature of between 250° and 300° F. After the heavy metal 31 is fluid, the bolts 39 are sequentially tightened in order to pick up the shield plug assembly 11. The bolts are carefully tightened in a manner so that each bolt is never strained beyond its elastic limit and permanent deformation is avoided. The bolts 39 transfer the weight of the shield plug assembly from the shoulder 26 to the bearing 40. Raising the shield plug assembly also disengages the static seal 25. The dip-ring seal 28 then comes into operation to isolate the molten sodium 6 from the atmosphere. To center the fuel handling machine (not shown) over a desired fuel assembly, the segmented ring 38 and the shield plug assembly are rotated by a motor which engages the teeth 42. The trough 30 rotates with respect to the stationary skirt ring 33.

After the fuel handling operation is completed, the reactor is returned to power operation by loosening the bolts 39. These bolts permit the shield plug assembly 11 to descend and transfer the weight of the shield plug assembly from the bearing 40 to the shoulder 26 of the support structure. The static seal 29 is engaged and its gasket is compressed to block the passage of sodium vapor up the annulus 9. The heavy metal 31 in the dip-seal trough is thus isolated from contamination.

Access to the dip-ring seal 28 is achieved by shutting down the reactor and removing the bolts 39. Isolation from the molten sodium 6 is maintained by the static seal 25. The elements of the segmented ring 38 are disassembled and removed to obtain access to the trough 30 and the skirt ring 33. The skirt ring 33 is welded to the washer 34 and when both are removed, the heavy metal 31 in the trough is accessible for cleaning and maintenance. At this point the bearing 40 is also accessible for lubrication and repair.

The gasket 25 forming the static seal between the upper shield plate 12 and the shoulder 26 is also accessable for cleaning and replacement. The sodium 6 is cooled to approximately 400° F. The bolts 39 are first removed along with the segments of the segmented ring assembly 38. Thereafter the bolts 23 are loosened so that the lower shield plate 13 and the shield plug 14 descend and rest on the shoulder 8 of the support structure. A metal to metal abutting contact seal is formed between the lower edge 15 of the shield plug and the support structure. The tremendous weight of the shield plug and the lower shield plate insures that the abutting seal isolates the gasket 25 from the molten sodium. Next the bolts 23 and 35 are removed along with the skirt ring 33 and the upper shield plate 12 to expose the gasket 25.

It should be understood that this apparatus has application in both pool and loop type nuclear reactors as well as breeder reactors and non-breeder reactors. In addition, the location of the trough 30 can be interchanged with the position of the skirt ring 33 and the washer 34. Further, if the nuclear reactor has a plurality of eccentric rotating shield plug assemblies, each smaller shield plug can be supported within the larger shield plug assembly in the same manner as the shield plug assembly 11 is supported from the support structure 4 in the described embodiment.

Thus, although the best mode contemplated for carrying out the present invention has been herein shown and described, it will be apparent that modification and variation may be made without departing from what is considered to be the subject matter of the invention.

What is claimed is:

1. An apparatus for sealing a rotatable shield plug in a liquid metal nuclear reactor, comprising:
   (a) a rotatable shield plug assembly having a dip-ring seal, said seal providing a fluid/solid barrier between the liquid metal in the reactor and the atmosphere;
   (b) a static seal for the rotatable shield plug assembly, said static seal being located between the dip-ring seal and the liquid metal in the reactor;
   (c) a bearing attached to and supporting the plug for rotation with respect to a wall of the reactor;
   (d) a lifting ring assembly overlying the shield plug assembly and the bearing, said lifting ring assembly being supported for rotation by the bearing; and
   (e) a plurality of bolts engaging the ring assembly and the shield plug in a first position and in a second position, in the first position said bolts disengage the static seal and transfer the weight of the shield plug assembly onto the bearing for rotation of the shield plug with respect to the wall of the reactor and in the second position said bolts transfer the weight of the shield plug back to the reactor wall for operation at power and cause engagement of the static seal, thereby isolating the dip-ring seal from the liquid metal.

2. An apparatus as in claim 1 wherein the static seal has compression limiting pads.

3. An apparatus as in claim 1 including an abutting seal located between the static seal and the liquid metal in the reactor for isolating the static seal from the liquid metal.

4. An apparatus as in claim 1 in which the lifting ring assembly includes a plurality of removable section elements that provide access to the dip-ring seal.

5. An apparatus as in claim 1 in which the dip-ring seal includes a trough for holding a meltable metal alloy, said trough being located in the surface of the top wall of the shield plug and underlying the lifting ring.

6. An apparatus as in claim 1 wherein in the first position the bolts are tightened to raise the shield plug up and off of the reactor wall and to transfer the weight of the shield plug onto the bearing.

7. An apparatus for sealing a rotatable shield plug in a liquid nuclear reactor, comprising:
   (a) a shield plug assembly having a plurality of circular plates, one of said plates operatively secures a shear key to the nuclear reactor, a second of said plates provides a sealing surface for a static seal;
   (b) a nuclear reactor side wall having a first shoulder for static sealing engagement with the second of said plates, said side wall also having means forming a dip-ring seal with said shield plate assembly, said static seal being located between the dip-ring seal and the liquid metal in the reactor;
   (c) a bearing operatively attached to the nuclear reactor side wall for supporting the shield plug assembly for rotation with respect to said wall;
   (d) a lifting ring assembly overlying the shield and the bearing, said lifting ring assembly being supported for rotation by the bearing;
   (e) a plurality of bolts engaging the ring assembly and the shield plug assembly in a first position and in a second position, in the first position said bolts disengage the static seal and transfer the weight of the shield plug onto the bearing for rotation of the shield plug with respect to the wall of the reactor and in the second position said bolts cause engagement of the static seal thereby isolating the dip-ring seal from the liquid metal and transfer the weight of the shield plug and back to the reactor wall for operation at power; and
   (f) means forming an abutting seal between the shield plug assembly and the nuclear reactor side wall, said seal formed by the abutting contact of a third circular plate of the shield plug assembly with a second shoulder of a side wall of the nuclear reactor, said abutting seal being located between the liquid metal and the static seal.

8. An apparatus as in claim 7 wherein the abutting seal is formed by metal to metal contact with the outside edge of the bottom wall of the shield plug assembly and the second shoulder of the nuclear reactor side wall.

9. An apparatus as in claim 7 wherein the abutting seal is located between the static seal and the liquid metal reactor coolant and the dip-rig seal located between the static seal and the atmosphere such that between the liquid metal reactor coolant and the atmosphere are in turn the abutting seal, the static seal and the dip-ring seal.

10. An apparatus as in claim 9 wherein each of said seals is independently engageable.

11. An apparatus as in claim 7 wherein the second circular plate of the shield plate assembly is removable for exposing the static seal while said abutting seal isolates the static seal from the liquid metal.

* * * * *